(12) United States Patent
Kim et al.

(10) Patent No.: US 6,445,472 B1
(45) Date of Patent: *Sep. 3, 2002

(54) OPTICAL FIBER SUBSCRIBER NETWORK

(75) Inventors: Jin-Han Kim, Kyongsangbuk-do (KR); Won-Ha Choe, Kyongsangnam-do (KR); Soong-Hee Lee, Kyongsangnam-do (KR)

(73) Assignee: Samsung Electronics, Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,798

(22) Filed: Sep. 14, 1998

(30) Foreign Application Priority Data

Sep. 12, 1997 (KR) ............................................ 97-47032

(51) Int. Cl.⁷ .................................................. H04J 14/02
(52) U.S. Cl. ........................................ 359/125; 359/133
(58) Field of Search ........................ 359/121, 124–125, 359/133, 139

(56) References Cited

U.S. PATENT DOCUMENTS

| | | | |
|---|---|---|---|
| 4,441,180 A | * 4/1984 | Schussler | 359/123 |
| 4,901,306 A | 2/1990 | Gardner | |
| 5,119,223 A | 6/1992 | Panzer et al. | |
| 5,202,780 A | * 4/1993 | Fussganger | 359/125 |
| 5,337,175 A | * 8/1994 | Ohnsorge et al. | 359/125 |
| 5,351,146 A | 9/1994 | Chan et al. | |
| 5,452,115 A | 9/1995 | Tomioka | |
| 5,457,760 A | 10/1995 | Mizrahi | |
| 5,469,283 A | * 11/1995 | Vinel et al. | 359/118 |
| 5,510,921 A | 4/1996 | Takai et al. | |
| 5,550,818 A | 8/1996 | Brackett et al. | |
| 5,557,439 A | 9/1996 | Alexander et al. | |
| 5,587,830 A | 12/1996 | Chraplyvy et al. | |
| 5,706,111 A | * 1/1998 | Morales et al. | 359/125 |
| 5,717,795 A | 2/1998 | Sharma et al. | |
| 5,748,348 A | * 5/1998 | Heidemann et al. | 359/125 |
| 5,808,767 A | * 9/1998 | Williams et al. | 359/152 |
| 5,946,117 A | * 8/1999 | Meli et al. | 359/124 |

FOREIGN PATENT DOCUMENTS

| | | |
|---|---|---|
| EP | 0 599 177 A1 | 6/1994 |
| EP | 0626768 A1 | 11/1994 |
| EP | 0660637 A2 | 6/1995 |
| GB | 2 315 178 A | 1/1998 |
| WO | WO 94/06226 A1 | 3/1994 |

\* cited by examiner

*Primary Examiner*—Jason Chan
*Assistant Examiner*—Christina Y Leung
(74) *Attorney, Agent, or Firm*—Robert E. Bushnell, Esq.

(57) ABSTRACT

A wavelength division multiplexed optical fiber subscriber network capable of expanding the number of subscribers. In the optical fiber subscriber network, a central office allocates a unique combination of optical wavelengths to a subscriber upon receipt of a service request signal from the subscriber, wavelength division multiplexes requested information together with the combined optical wavelength and the transmits the wavelength, division multiplexed optical wavelength through an optical fiber. A plurality of optical subscriber devices optically distributes, filters and combines the wavelength division multiplexed optical signals received through the optical fiber to select optical wavelengths allocated thereto, and outputs the selected optical wavelengths to corresponding subscriber terminals.

26 Claims, 6 Drawing Sheets

OPTICAL FIBER SUBSCRIBER NETWORK

CLAIM FOR PRIORITY

This application makes reference to, incorporates the same herein, and claims all benefits accruing under 35 U.S.C. § 119 from an application for OPTICAL FIBER SUBSCRIBER NETWORK earlier filed in the Korean Industrial Property Office on the of Sep. 12, 1997, and there duly assigned Ser. No. 47032/1997, a copy of which application is annexed hereto.

BACKGROUND OF THE INVENTION

1. Technical Field

The present invention relates to an optical fiber subscriber network, and in particular, to a wavelength division multiplexed (WDM) optical fiber subscriber network for serving an expanded number of subscribers.

2. Related Art

As high speed, high-capacity user communication services progress along with the development of the information-oriented society, there have been demands for a wideband communication network capable of accommodating different types of data including voice, data, still-image, and live-video/voice multicast transmissions to a large number of users. One of the fast-growing constituents of wideband communication networks is an optical fiber subscriber network which uses optical signals to convey information across an optical waveguide. Frequently, time-division multiplexing (TDM) is employed to convey information from plural information sources on a single channel. However, the transmission capacity is limited by fiber dispersion and the need to generate high peak power pulse.

Wavelength division multiplexing (WDM) has been recently developed as a cost-effective way to increase the information-carrying capacity of existing fiber optic network. A wavelength division multiplexed (WDM) optical fiber subscriber network employs plural optical signal channels, each channel being assigned a particular channel wavelength. In a WDM system, signal channels are generated, multiplexed, transmitted over a single waveguide, and demultiplexed to individually route each channel wavelength to a designated receiver. Through the use of optical amplifiers, such as doped fiber amplifiers, plural optical channels are directly amplified simultaneously, facilitating the use of WDM systems in long distance optical systems. Exemplars of wavelength division multiplexed optical fiber subscriber networks are disclosed in U.S. Pat. No. 4,901,306 for Wavelength-Division Multiplexed Optical Fiber Network issued to Gardner, U.S. Pat. No. 5,119,223 for Bidirectional Light Wavelength (LWG) Telecommunication System And Method For Wavelength Separation Mode (Bidirectional Wavelength Separation Mode) Between A Central Telecommunication Location And Plurality Of decentralized Telecommunication Locations issued to Panzer et al., U.S. Pat. No. 5,351,146 for All-Optical Network Architecture issued to Chan et al., U.S. Pat. No. 5,457,760 for Wavelength Division Optical Multiplexing Elements issued to Mizrahi, U.S. Pat. No. 5,510,921 for Optical Frequency Division Multiplexing Network issued to Takai et al., U.S. Pat. No. 5,550,818 for System For Wavelength Division Multiplexing/Asynchronous Transfer Mode Switching For Network Communication issued to Brackett et al., U.S. Pat. No. 5,557,439 for Expandable Wavelength Division Multiplexed Optical Communication Systems issued to Alexander et al., U.S. Pat. No. 5,587,830 for high Capacity Optical Fiber Network issued to Chraplyvy et al., and U.S. Pat. No. 5,717,795 for Optical Wavelength Division Multiplexed Network System issued to Sharma et al.

Many conventional optical fiber subscriber networks require high density wavelength division multiplexing which uses more than three wavelengths to increase the information-carrying capacity of existing fiber optic network. A wavelength variable filter or WDM multiplexer/demultiplexer must be used which requires precise manufacturing technology. Therefore, in building subscriber networks, there arise safety and cost problems. In particular, there is a limitation in expanding the new subscribers or increasing the communication speed.

SUMMARY OF THE INVENTION

Accordingly, it is therefore an object of the present invention to provide an improved wavelength division multiplexed optical fiber subscriber network.

It is also an object to provide a cost-effective wavelength division multiplexed optical fiber subscriber network.

It is another object to provide a wavelength division multiplexed optical fiber subscriber network for supporting expanded number of subscribers with high reliability and flexibility.

It is yet another object to provide a wavelength division multiplexed optical fiber subscriber network for carrying increased number of subscribers with greater margin of safety and cost efficiency.

These and other objects of the present invention can be achieved by an optical fiber subscriber network including a central office for allocating a unique combination of optical for wavelengths to a subscriber upon receipt of a service request signal from the subscriber, wavelength division multiplexing (WDM) service requested information together with the combined optical wavelength, and for transmitting the WDM optical wavelength through an optical fiber; and a plurality of optical subscriber devices for optically distributing, filtering and combining the WDM optical signals received through the optical fiber to select optical wavelengths allocated thereto and outputting the selected optical wavelengths to corresponding subscriber terminals.

Preferably, the central office includes: an exchange for allocating a combination of the wavelengths to a subscriber upon receipt of the service request signal from the subscriber; a plurality of optical transmitters for converting electric signals output from the exchange to optical signals of unique wavelengths; a WDM multiplexer for multiplexing the optical signals output from the optical transmitters and transmitting the multiplexed optical signals to the optical fiber; and an optical amplifier for amplifying the output of the WDM multiplexer to compensate for transmission loss of the multiplexed optical signals being transmitted to the subscriber through the optical fiber.

Preferably, the optical subscriber device includes: an optical distributor for distributing the WDM multiplexed optical signals received through an incoming optical fiber to Q internal optical fibers; a fixed optical filter for filtering a wavelength group allocated thereto out of the WDM multiplexed optical signals to receive an optical wavelength group pre-allocated in the central office; an optical receiver module connected to an output of the fixed optical filter for converting the optical signals output from the fixed optical filter to electric signals; a concentrator for switching and concentrating an output of the optical receiver module to multimedia terminals connected to output ports of the optical subscriber device; and an electronic signal converter for converting an output of the concentrator so as to connect the multimedia terminals to the concentrator.

In addition, the optical fiber subscriber network includes a plurality of optical distributors placed on the optical fiber intervening between the central office and the optical subscriber devices for distributing the optical signals output from the central office according to construction of a service requested network. The optical fiber subscriber device may include an optical amplifier placed on the optical fiber intervening between the central office and the optical subscriber devices for compensating for distribution loss of the optical signals due to the optical distributors.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1:
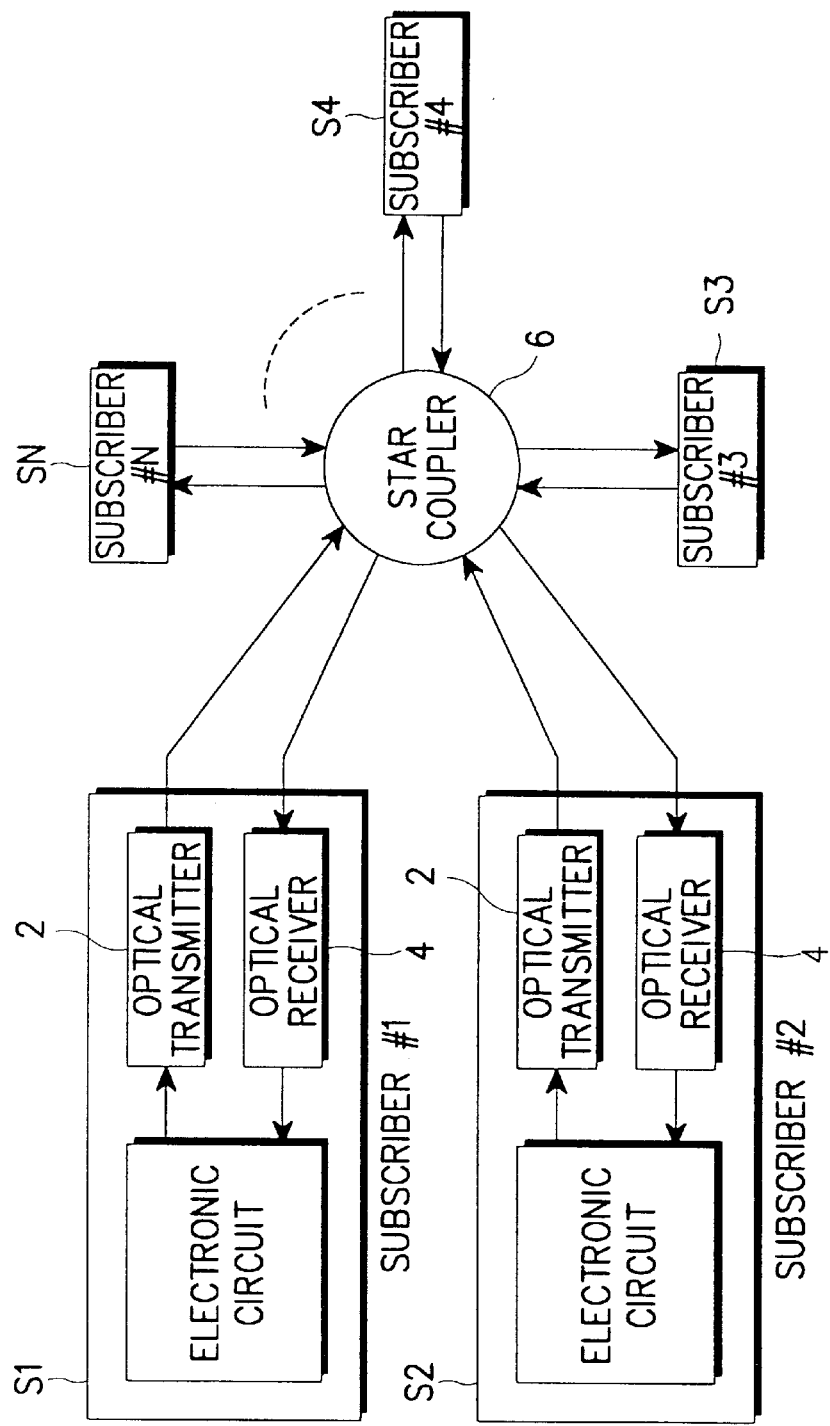
FIG. 1 is a block diagram of a first example of a typical wavelength division multiplexed (WDM) optical fiber subscriber network.

Referring now to the drawings and particularly to FIG. 1, which illustrates a first embodiment of a typical wavelength division multiplexed (WDM) optical fiber subscriber network. As shown in FIG. 1, the first WDM optical fiber subscriber network includes N subscriber devices S1–SN, each having an optical transmitter 2 and an optical receiver 4, and a star coupler 6 for star-coupling the subscriber devices S1–SN. In operation, the optical transmitters 2 in the respective subscriber devices S1–SN output optical signals of wavelengths $\lambda_1$–$\lambda_N$ through optical transmission lines (i.e., optical fibers) connected to the star coupler 6. The star coupler 6 then couples the received optical signals and distributes the coupled signals to the optical transmission lines connected to the optical receivers 4 in the respective subscriber devices S1–SN. Here, each of the optical receivers 4 has a wavelength selection filter (not shown in FIG. 1) for selectively passing the optical signal of a specific wavelength.

Figure 2:
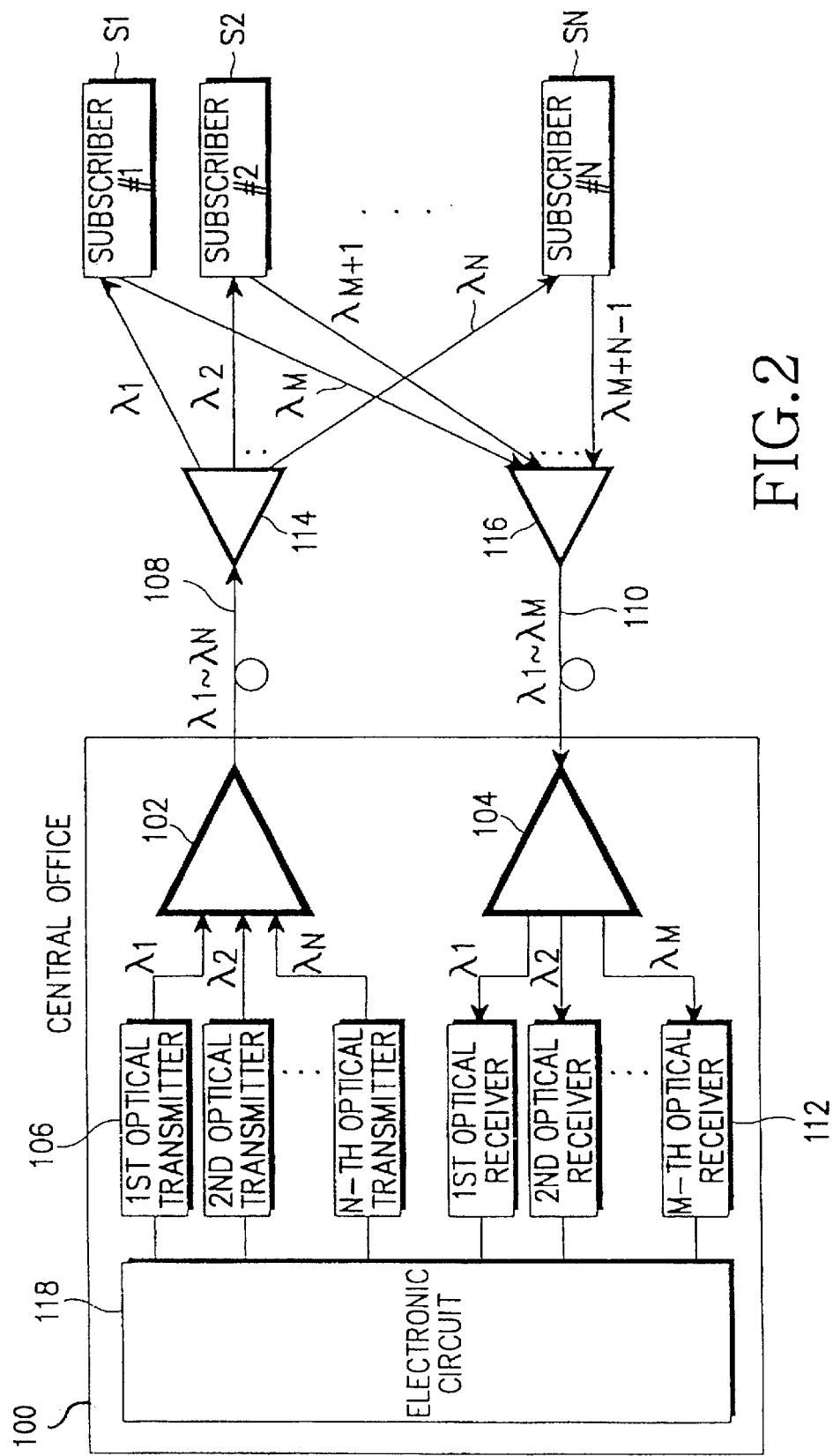
FIG. 2 is a block diagram of a second example of a typical wavelength division multiplexed (WDM) optical fiber subscriber network.

FIG. 2 illustrates a second embodiment of a typical wavelength division multiplexed (WDM) optical fiber subscriber network of a PPL-type (Passive Photonic Loop type). The WDM optical fiber subscriber network combines and distributes N wavelengths by using WDM multiplexers 102 and 16 and WDM demultiplexers 104 and 114, and then connects the wavelengths to the respective subscriber devices S1–SN. A central office 100 consists of N optical transmitters 106 for transmitting the optical signals of the wavelengths $\lambda_1$–$\lambda_N$, the WDM multiplexer 102 for multiplexing (combining) the optical signals output from the optical transmitters 106 and transmitting the multiplexed optical signals via an optical transmission line (i.e., optical fiber) 108, a WDM demultiplexer 104 for demultiplexing the optical signals of the wavelengths $\lambda_1$–$\lambda_M$ transmitted upward from the subscriber side through an optical transmission line 110, and M optical receivers 112 for receiving the optical signals distributed (demultiplexed) by the WDM demultiplexer 104. Further, the subscriber side, consisting of a WDM demultiplexer 114 and a WDM multiplexer 116 which are shared by N subscriber devices S1–SN, is connected to the central office 100 via the optical transmission lines 108 and 110. The WDN demultiplexer 114 at the subscriber side distributes the optical signals of the wavelengths $\lambda_1$–$\lambda_N$ received through the optical transmission line 108 to the respective subscriber devices S1–SN. The WDM multiplexer 116 combines (multiplexes) the optical signals of the wavelengths $\lambda_1$–$\lambda_M$ transmitted upward from the subscriber devices S1–SN and transmits the combined signals to the central office 100 via the optical transmission line 110.

In downward transmission of the optical signals (from the central office 100 to the subscriber side), the optical transmitters 106 of the central office 100 convert the electric signals output from the electronic circuit 118 to the optical signals of the wavelengths $\lambda_1$–$\lambda_N$, and the WDM multiplexer 102 combines the optical signals output from the optical transmitters 106 and transmits the combined optical signals to the WDM demultiplexer 114 through the downward optical transmission line 108. The WDM demultiplexer 114 then distributes the received optical signals of the wavelengths $\lambda_1$–$\lambda_N$ to the respective subscriber devices S1–SN.

In upward transmission of the optical signals (from the subscriber side to the central office 100), the subscriber devices S1–SN transmit the optical signals of the wavelengths $\lambda_1$–$\lambda_M$, and the WDM multiplexer 116 combines the optical signals output from the subscriber devices S1–SN and transmits the combined optical signals to the WDM demultiplexer 104 through the upward optical transmission line 110. The WDM demultiplexer 104 then distributes the optical signals of the wavelengths $\lambda_1$–$\lambda_M$ to the optical receivers 112, which convert the received optical signals to electric signals and output the converted electric signals to the electronic circuit 118.

Figure 3:
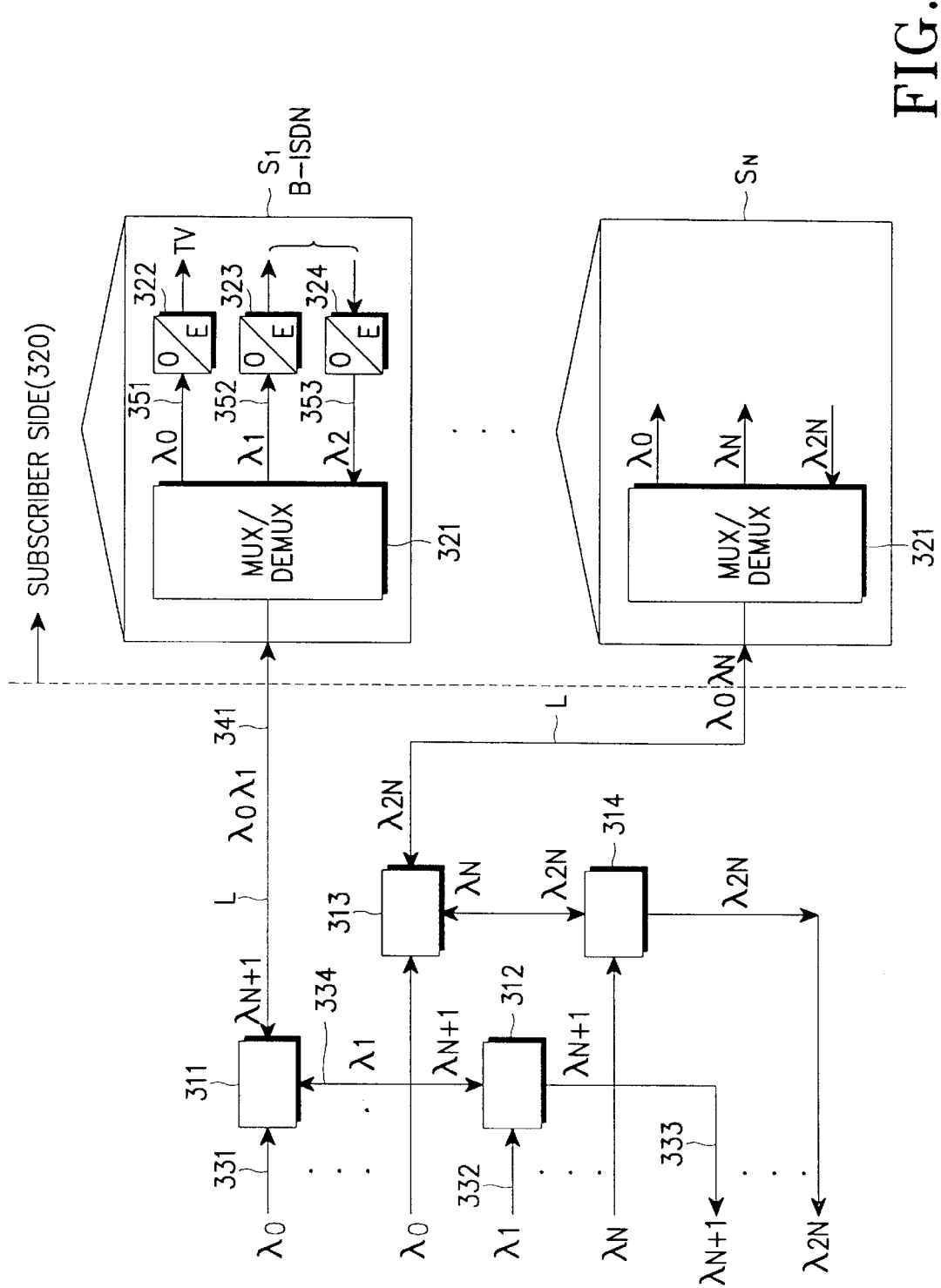
FIG. 3 is a block diagram of a third example of a typical wavelength division multiplexed (WDM) optical fiber subscriber network.

FIG. 3 illustrates a third embodiment of a typical wavelength division multiplexed (WDM) optical fiber subscriber network which uses different wavelengths according to the types of the distributive services. The respective subscribers use the different wavelengths for the upward/downward communicative services, so as to efficiently use the limited number of the optical wavelengths.

In operation, the downward signals (transmitted from the central office to the subscriber side) are used for both the distributive service (e.g., CATV (Cable TV)) and the communicative service (e.g., B-ISDN (Broadband-Integrated Services Digital Network)), whereas the upward signals (transmitted from the subscriber side to the central office) are used for the communicative service only. The downward distributive service branches (divides) the downward signals into N signals using a single wavelength $\lambda_0$ and transmits the branched signals through N optical transmission lines. The downward communicative service (B-ISDN) allocates N unique wavelengths to the respective subscriber devices, and the upward communicative service (B-ISDN) also allocates the unique wavelengths to the respective subscriber devices. Therefore, it is necessary to secure (2N+1) wavelengths in order to accommodate N subscribers.

Specifically, the downward distributive service transmits the downward signal for a subscriber device S1 through an optical fiber 331 using the wavelength $\lambda_0$, and the downward communicative service transmits the downward signal through an optical fiber 332 using the wavelength $\lambda_1$. The wavelength $\lambda_1$ output from a WDM multiplexer/demultiplexer 312 is combined with the wavelength $\lambda_0$ received through the optical fiber 331 in a WDM multiplexer/demultiplexer 311, and the combined wavelength $\lambda_0\lambda_1$ is transmitted to the subscriber device S1 through an optical fiber 341. The combined wavelength is demultiplexed into the wavelengths $\lambda_0$ and $\lambda_1$ by a WDM multiplexer/demultiplexer 321 in the subscriber device S1. Subsequently, the wavelength $\lambda_0$ is converted to an electric signal in an optoelectric converter 322 and transmitted to a TV set, and the wavelength $\lambda_1$ is converted to an electric signal in an optoelectric converter 323 and transmitted to a B-ISDN terminal.

On the other hand, in the upward service, an optoelectric converter 324 converts the electric signal from the B-ISDN terminal to an optical signal, and the WDM multiplexer/demultiplexer 321 upward transmits the converted optical signal through the optical fiber 341. The signal on the optical fiber 341 is transmitted to an optical fiber 334 through the WDM multiplexer/demultiplexer 311, and is then transmitted to the central office through the WDM multiplexer/demultiplexer 312 and an optical fiber 333. In the same manner, the other subscriber devices S2–SN in the subscriber side 320 use two unique wavelengths.

Since the optical fiber subscriber networks as described in FIGS. 1 to 3 employ a high density wavelength division multiplexing which uses more than three wavelengths, a wavelength variable filter or a WDM multiplexer/demultiplexer which requires precise manufacturing technology must be used. Therefore, in building many subscriber networks, there arise the safety and cost problems. In addition, there is a limitation in expanding the new subscribers or increasing the communication speed.

Figure 4:
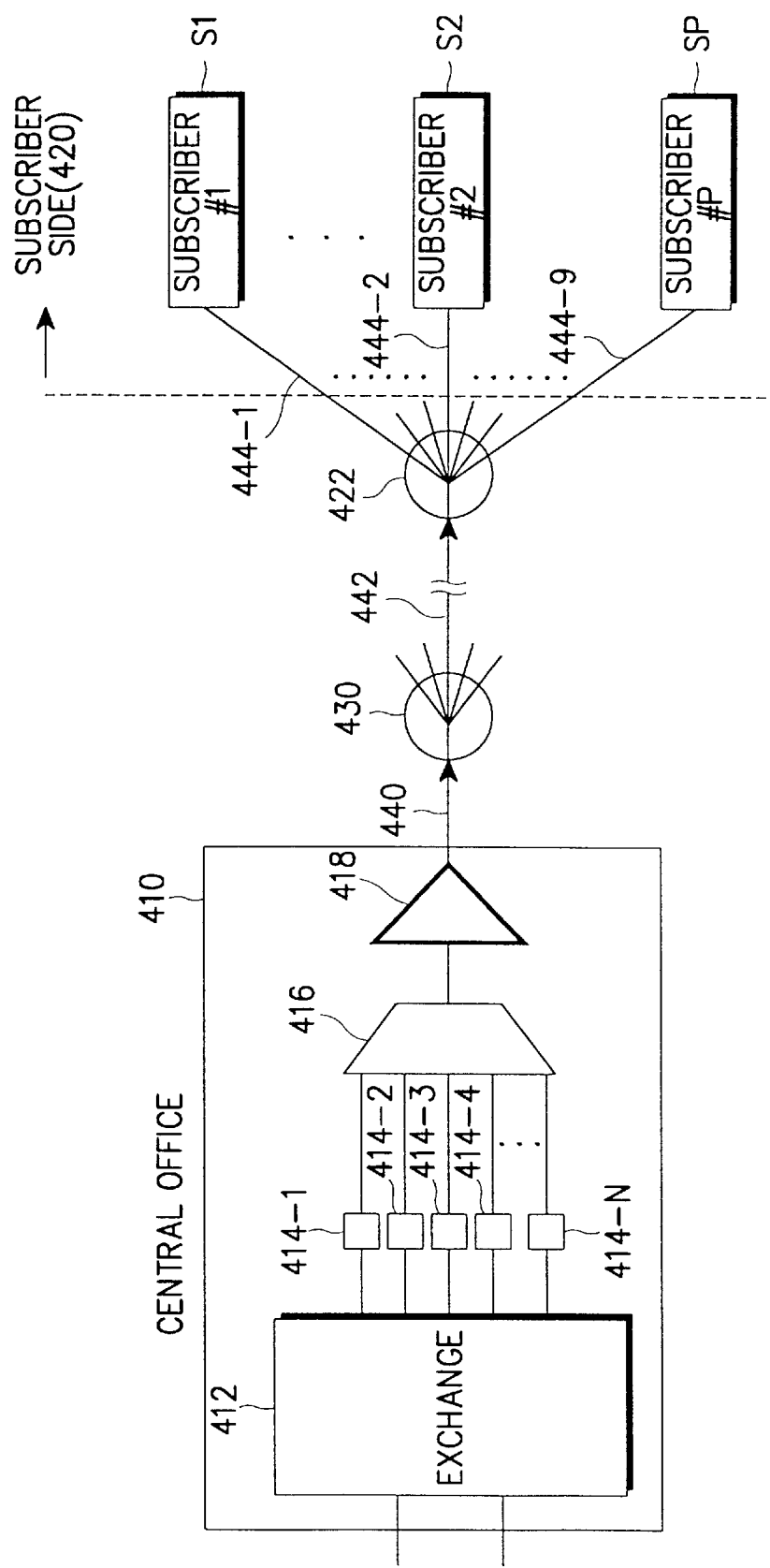
FIG. 4 is a block diagram of a wavelength division multiplexed (WDM) optical fiber subscriber network constructed according to a preferred embodiment of the present invention.

FIG. 4 illustrates an improved and cost-effective wavelength division multiplexed (WDM) optical fiber subscriber network constructed according to a preferred embodiment of the present invention. As shown in FIG. 4, the optical fiber subscriber network consists of a central office 410, a subscriber side 420 including P subscribers S1–SP, and an upward/downward optical fiber cable 440 serving as an optical communication path for transmitting data between the central office 410 and the subscriber side 420. Here, the upward/downward optical fiber cable 440 has distributers 422 and 430 disposed sporadically thereon.

The central office 410 includes an ATM (Asynchronous Transfer Mode) exchange 412 which is commonly used for the wideband communication network, N optical transmitters 414 composed of modules 414-1 to 141-N for converting the electric signals output from the ATM exchange 412 to optical signals of unique wavelengths, a WDM multiplexer 416 for multiplexing the optical signals output from the optical transmitters 414 to transmit the multiplexed optical signals through the optical fiber cable 440, and an optical amplifier 418 for amplifying the output optical signals of the WDM multiplexer 416 to compensate for the loss of the optical signals which may be caused by the optical fiber cable 440 and the distributors 422 and 430 during transmission of the optical signals to the subscriber side 420.

Further, the subscriber side 420 includes P subscribers S1–SP each having optical subscriber devices for selecting an optical wavelength group pre-allocated to the subscriber and for outputting the selected optical wavelength group to a corresponding terminal. The detailed construction of the optical subscriber device 424 for the first subscriber S1 is illustrated in FIG. 5, by way of example.

Figure 5:
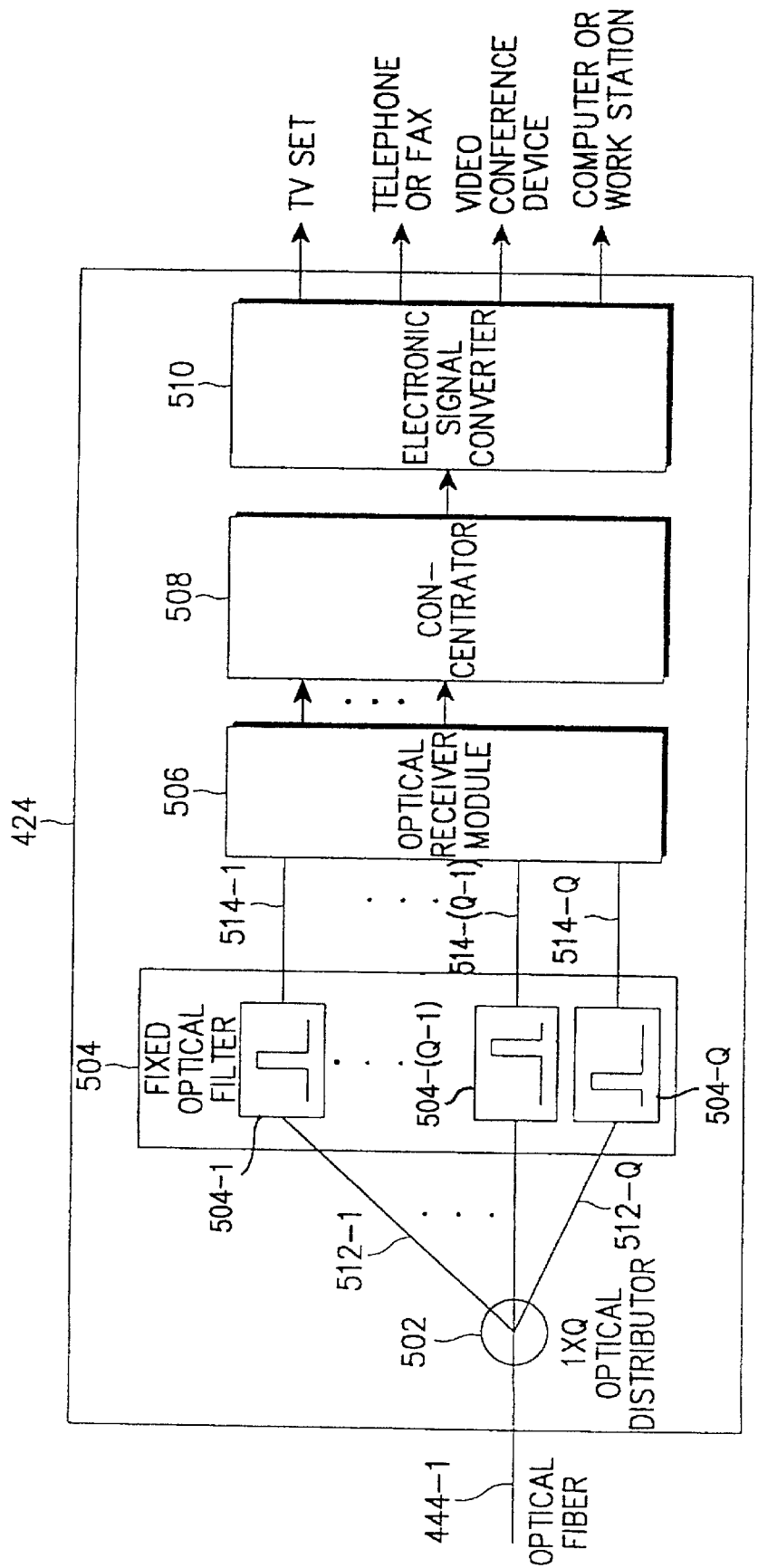
FIG. 5 is a block diagram of an optical subscriber device installed in the house of the subscriber according to a preferred embodiment of the present invention.

FIG. 5 shows the optical subscriber device installed in the house of the respective subscribers S1–SP according to a preferred embodiment of the present invention. Referring to FIG. 5, an optical distributor 502 distributes the WDM multiplexed optical signal received from the central office 410 via an incoming optical fiber 444-1 to Q optical fibers 512-1 to 512-Q. A fixed optical filter 504 consists of Q fixed optical filtering elements 504-1 to 504-Q and each fixed optical filtering element filters a corresponding wavelength group out of the N WDM multiplexed optical signals. An optical receiver module 506, disposed at the rear stage of the fixed optical filter 504, converts the received optical signals to electric signals. A concentrator 508 switches or concentrates the output of the optical receiver module 506 to the multimedia terminals (e.g., a TV set, a telephone or facsimile, a video conference device, and a computer or work station) connected to output ports of the optical subscriber device 424. An electronic signal converter 510 converts an output of the concentrator 508 so as to be suitable for the multimedia terminals. In the embodiment, an ATM exchange or a packet exchange is preferably used for the concentrator 508. Further, the electronic signal converter 510 uses a network connector for connecting the computer or the work station, a CODEC (Coder-DECoder) for connecting the TV set and the video conference device, or a PBX (Private Branch Exchange) for connecting the telephone or the facsimile.

In operation, the exchange 412 of the central office 410 constantly checks whether a connection request signal is received from a certain subscriber, and whether there is extra bandwidth to allocate to the corresponding subscriber. If there is extra bandwidth, the exchange 412 notifies an internal service control layer that it is possible to accommodate the required service, and then updates a service allocation table. When it is determined to accommodate the service through a specific wavelength, the exchange 412 enables optical transmission modules 414-1 to 414-N of the optical transmitters 414 to transmit the optical signals. The optical signals, each having different wavelengths, transmitted from the optical transmitters 414 are combined by the WDM multiplexer 416 and transmitted through the optical fiber cable 440. In this situation, it is not necessary that the respective transmission modules 414-1 to 414-N for the respective wavelengths should have the same information transmission rate. Further, to compensate for the distribution loss of the optical signals, the central office 410 may have the optical amplifier 418 at the final stage thereof, if necessary.

Meanwhile, the WDM multiplexed optical signals output from the central office 410 are transmitted through the optical cable 440 and branched out properly by the optical distributors 430 and 422 according to the construction of the service requested network. Moreover, when necessary, the optical cable 440 may have further distributors, and the portion having the greater distribution loss may include a separate optical amplifier to compensate for the distribution loss. The optical signals, having reached the corresponding subscriber through the distributors 430 and 422, are distributed by the 1XQ optical distributor 502 in the subscriber device 424 and filtered by the fixed optical filter 504 consisting of Q optical filtering elements 504-1 to 504-Q for passing specific wavelengths functioning as addresses of the physical layer. The filtered Q optical wavelengths are transmitted through Q optical fibers 514-1 to 514-Q to optical receiver module 506, which converts the received optical signals to electric signals. The output signals of the optical receiver module 506 are transferred to the electronic signal converter 510 via the concentrator 508 which distributes, concentrates or switches the input signals. The electronic signal converter 510 converts the received signals to signals suitable for the multimedia terminals.

Figure 6:
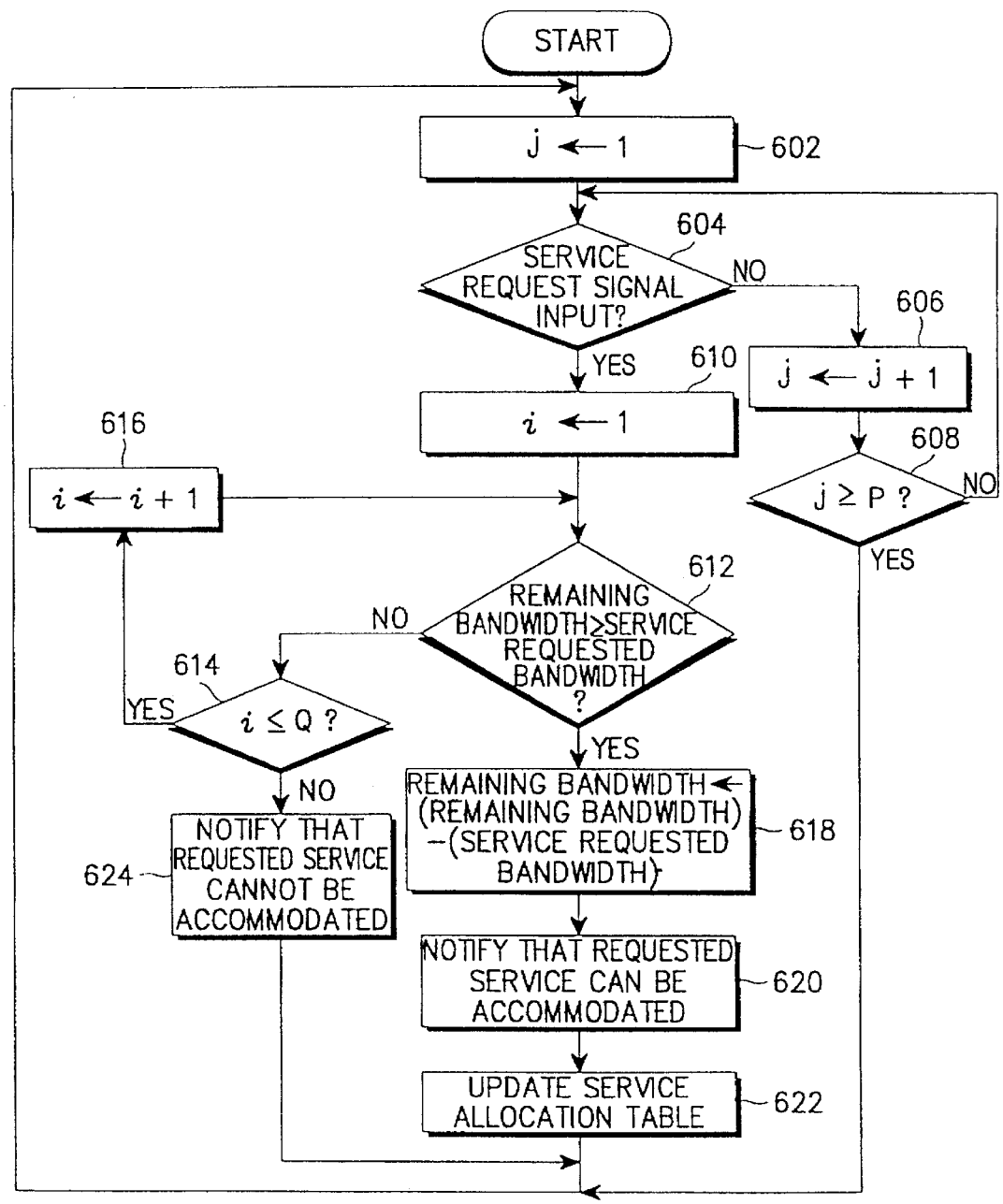
FIG. 6 is a flow chart of the operations of a central office for allocating the services for the respective optical wavelength groups according to a preferred embodiment of the present invention.

FIG. 6 shows a flow chart illustrating how the central office 410 of the optical fiber subscriber network allocates the services for the respective optical wavelength groups according to the present invention. In FIG. 6, reference character "j" denotes an identification number of a group consisting of different wavelengths and reference character "i" denotes an identification number of the respective optical wavelengths in the respective groups.

Referring to FIGS. 4–6, the exchange 412 (strictly speaking, a controller of the exchange 412) monitors the optical wavelength groups allocated to the respective subscribers from the first group (j=1) to the last group (j=P) at prescribed periods to check whether a new service request signal is received (steps 602–608). Meanwhile, if the service request signal is received from a specific group at step 604, the exchange 412 detects the remaining bandwidth of the optical wavelength from the first optical wavelength (i=1) to the last optical wavelength (i=Q) and determines whether the detected remaining bandwidth is wider than or equal to the service requested bandwidth (steps 610–616). Specifically, the exchange 412 first detects the remaining bandwidth of the first optical wavelength (i=1) at step 610, and determines whether the detected remaining bandwidth is wider than or equal to the service requested bandwidth at step 612. If the detected remaining bandwidth is narrower than the service requested bandwidth at step 612, the exchange 412 performs the same operation for the next optical wavelength (i=i+1). The same operation is repeated even for the last optical wavelength (i=Q). Although the remaining bandwidth is detected even for the last optical wavelength (i=Q), if it is narrower than the service requested bandwidth, the exchange 412 notifies the upper service control layer that it is impossible to accommodate the requested service at step 624, and then returns to step 602.

However, when the remaining bandwidth for any one of the optical wavelengths is equal to or wider than the service requested bandwidth at step 612, the exchange 412 determines the remaining bandwidth for the optical wavelength at step 618, notifies the upper service control layer that it is possible to accommodate the requested service at step 620, and updates a service allocation table of the optical wavelengths at step 622, and then returns to step 602.

In conclusion, when N optical wavelengths are WDM multiplexed by the WDM multiplexer, the passive optical fiber subscriber network of the invention has a downward structure capable of providing connection service to P subscribers (where P>N). That is, N WDM multiplexed optical signals are transmitted to the respective subscribers through the multistage optical distributors 430 and 422. Then, in the subscriber device 424, the fixed optical filter 504 passes a combination of Q wavelengths (where $1<Q \leq N$) allocated to the subscriber. Accordingly, it is possible to increase the number of the connectable subscribers by allocating the combination of the multiple wavelengths rather than a specific wavelength to each subscriber. Here, the number of the connectable subscribers is determined by $$P = C_N^Q = \frac{N!}{Q!(N-Q)!} \quad (1)$$

where P is the number of connectable subscribers, N the number of the optical wavelengths, and Q number of the wavelengths allocated to the subscribers as the identification codes. Here, P has the maximum value when Q=N/2 (where N is an even number), or Q=(N∓1)/2 (where N is an odd number).

For example, when N=16 and Q=4, the optical fiber subscriber network can accommodate 1280 subscribers (P=1820). Thus, in order to increase the number of subscribers, it is needed to increase the number Q of wavelengths allocated to the respective subscribers. That is, when 8 wavelengths are allocated to the respective subscribers (Q=8), the number P of the connectable subscribers becomes 12870. Further, use of the optical fiber subscriber network can reduce use of the high-priced devices such as the wavelength variable optical filter, the multiplexer/demultiplexer and the wavelength converter.

Further, when an existing subscriber requires high speed communication, it is possible to reallocate the optical wavelength group so as to allow the subscriber to use wavelength with higher transmission rate, or additionally allocate a wavelength group other than the existing wavelength group.

As described above, the optical fiber subscriber network of the invention has an increased number of connectable subscribers and reduces use of the wavelength variable optical filter or the WDM multiplexer which requires precise manufacturing technology, thereby contributing to the reduction in the cost of building the optical fiber subscriber network. In addition, when a certain subscriber requires an increase in the communication capacity or the communication speed, it is possible to easily enhance the quality of the services by additionally allocating the wavelengths or allocating the high-speed wavelength.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An optical fiber subscriber network, comprising:
   a central office for allocating a combination of optical wavelengths to a subscriber upon receipt of a service request signal from said subscriber, for wavelength division multiplexing requested information together with a combined optical wavelength, and for transmitting wavelength division multiplexed optical signals through an optical fiber; and a plurality of optical subscriber devices for optically distributing said wavelength division multiplexed optical signals received through the optical fiber to internal optical fibers, and for outputting selected optical wavelengths to respective corresponding subscriber terminals;

wherein each said optical subscriber device comprises:

an optical distributor for distributing the wavelength division multiplexed optical signals received through an incoming optical fiber to the internal optical fibers;

an optical receiver module for converting distributed optical signals from said optical distributor to electrical signals;

a concentrator for switching and concentrating the electrical signals from said optical receiver module to provide outputs to multimedia terminals connected to output ports of said optical subscriber device; and a fixed optical filter for filtering a wavelength group allocated from the wavelength division multiplexed optical signals to receive an optical wavelength group pre-allocated in said central office and to output corresponding optical signals to said optical distributor.

2. The optical fiber subscriber network of claim 1, wherein said central office comprises:

an exchange for allocating a combination of the optical wavelengths to a subscriber upon receipt of the service request signal from said subscriber;

a plurality of optical transmitters for converting electric signals output from said exchange to optical signals of unique wavelengths;

a wavelength division multiplexer for wavelength division multiplexing the optical signals output from said optical transmitters, and for transmitting the wavelength division multiplexed optical signals to the optical fiber; and an optical amplifier for amplifying the wavelength division multiplexed optical signals to compensate for transmission loss for transmission to the subscriber through the optical fiber.

3. The optical fiber subscriber network of claim 2, further comprising a plurality of optical distributors placed on said optical fiber intervening between said central office and said optical subscriber devices for distributing the wavelength division multiplexed optical signals output from said central office according to construction of a service requesting network.

4. The optical fiber subscriber network of claim 3, further comprising an optical amplifier placed on said optical fiber intervening between said central office and said optical subscriber devices for compensating for distribution loss of the wavelength division multiplexed optical signals due to said optical distributors.

5. The optical fiber subscriber network of claim 1, wherein each said optical subscriber device further comprises:

an electronic signal converter for converting the outputs of said concentrator so as to connect the multimedia terminals to said concentrator.

6. The optical fiber subscriber network of claim 1, further comprising a plurality of optical distributors placed on said optical fiber intervening between said central office and said optical subscriber devices for distributing the wavelength division multiplexed optical signals output from said central office according to construction of a service requesting network.

7. The optical fiber subscriber network of claim 6, further comprising an optical amplifier placed on said optical fiber intervening between said central office and said optical subscriber devices for compensating for distribution loss of the wavelength division multiplexed optical signals due to said optical distributors.

8. The optical fiber subscriber network of claim 1, further comprising an optical amplifier placed on said optical fiber intervening between said central office and said optical subscriber devices for compensating for distribution loss of the wavelength division multiplexed optical signals due to said optical distributors.

9. The optical fiber subscriber network of claim 1, wherein said fixed optical filter is connected between an output of said optical distributor and an input of said optical receiver module.

10. An optical fiber subscriber network, comprising:

a central office for allocating a combination of optical wavelengths to a subscriber upon receipt of a service request signal from said subscriber, and for transmitting the wavelength division multiplexed optical wavelength through an optical fiber, said central office comprising:

an exchange for allocating the combination of the optical wavelengths to said subscriber upon receipt of the service request signal from said subscriber, a plurality of optical transmitters for converting electric signals output from said exchange to optical signals of unique wavelengths, a wavelength division multiplexer for wavelength division multiplexing the optical signals output from said optical transmitters, and for transmitting the wavelength division multiplexed optical signals through the optical fiber, and an optical amplifier for amplifying the wavelength division multiplexed optical signals to compensate for transmission loss for transmission to the subscriber through the optical fiber; and a plurality of optical subscriber devices for optically distributing the wavelength division multiplexed optical signals received through the optical fiber to select optical wavelengths allocated thereto, and for outputting the selected optical wavelengths to corresponding subscriber terminals;

wherein each said optical subscriber device comprises:

an optical distributor for distributing the wavelength division multiplexed optical signals received through an incoming optical fiber to internal optical fibers;

an optical receiver module for converting distributed optical signals from said optical distributor to electrical signals;

a concentrator for switching and concentrating the electrical signals from said optical receiver module to provide outputs to multimedia terminals connected to output ports of said optical subscriber device;

a fixed optical filter for filtering a wavelength group allocated from the wavelength division multiplexed optical signals to receive an optical wavelength group pre-allocated in said central office and to output corresponding optical signals to said optical distributor; and an electronic signal converter for converting the outputs of said concentrator so as to connect the multimedia terminals to said concentrator.

11. The optical fiber subscriber network of claim 10, further comprising a plurality of optical distributors placed on said optical fiber intervening between said central office and said optical subscriber devices for distributing the wavelength division multiplexed optical signals output from said central office according to construction of a service requesting network.

12. The optical fiber subscriber network of claim 10, further comprising an optical amplifier placed on said optical fiber intervening between said central office and said optical subscriber devices for compensating for distribution loss of the wavelength division multiplexed optical signals due to said optical distributors.

13. The optical fiber subscriber network of claim 10, further comprising a plurality of optical distributors placed on said optical fiber intervening between said central office and said optical subscriber devices for distributing the wavelength division multiplexed optical signals output from said central office according to construction of a service requesting network.

14. The optical fiber subscriber network of claim 10, further comprising an optical amplifier placed on said optical fiber intervening between said central office and said optical subscriber devices for compensating for distribution loss of the wavelength division multiplexed optical signals due to said optical distributors.

15. An optical fiber subscriber network, comprising:
   a central office for allocating a combination of optical wavelengths to a subscriber upon receipt of a service request signal from said subscriber, for wavelength division multiplexing requested information together with a combined optical wavelength, and for transmitting wavelength division multiplexed optical signals through an optical fiber; and
   a plurality of optical subscriber devices for optically distributing, filtering and combining said wavelength division multiplexed optical signals received through the optical fiber to select optical wavelengths allocated thereto and for outputting the selected optical wavelengths to corresponding subscriber terminals;
   wherein each said optical subscriber device comprises:
      an optical distributor for distributing the wavelength division multiplexed optical signals received through an incoming optical fiber to internal optical fibers;
      a fixed optical filter for filtering a wavelength group allocated from the wavelength division multiplexed optical signals to receive an optical wavelength group pre-allocated in said central office and to output corresponding optical signals;
      an optical receiver module connected to an output of said fixed optical filter for converting the corresponding optical signals output from said fixed optical filter to electric signals;
      a concentrator for switching and concentrating the electrical signals from said optical receiver module to provide outputs to multimedia terminals connected to output ports of said optical subscriber device; and
      an electronic signal converter for converting the outputs of said concentrator so as to connect the multimedia terminals to said concentrator.

16. The optical fiber subscriber network of claim 15, further comprising a plurality of optical distributors placed on said optical fiber intervening between said central office and said optical subscriber devices for distributing the wavelength division multiplexed optical signals output from said central office according to construction of a service requesting network.

17. The optical fiber subscriber network of claim 15, further comprising an optical amplifier placed on said optical fiber intervening between said central office and said optical subscriber devices for compensating for distribution loss of the wavelength division multiplexed optical signals due to said optical distributors.

18. An optical fiber subscriber network, comprising:
   a central office for allocating respective optical wavelength groups to respective subscribers, for wavelength division multiplexing requested information together with the optical wavelength groups, and for transmitting wavelength division multiplexed optical signals through an optical fiber; and
   a plurality of optical subscriber devices for receiving said wavelength division multiplexed optical signals through the optical fiber, for selecting an optical wavelength group allocated thereto, and for outputting the selected optical wavelength group to corresponding subscriber terminals;
   wherein said wavelength division multiplexed optical signals transmitted by said central office to each of said optical subscriber devices include all wavelength groups for all of said optical subscribers, and each said optical subscriber device receives and filters the wavelength division multiplexed optical signals, including all wavelength groups, in order to select its respective allocated optical wavelength group and to output corresponding optical signals; and
   wherein each said optical subscriber device comprises a concentrator for switching and concentrating the electrical signals from said optical receiver module to provide outputs to multimedia terminals connected to output ports of said optical subscriber device, and an electronic signal converter for converting the outputs of said concentrator so as to connect the multimedia terminals to said concentrator.

19. The optical fiber subscriber network of claim 18, wherein said central office comprises:
   an exchange for allocating a combination of optical wavelengths to a subscriber upon receipt of the service request signal from said subscriber;
   a plurality of optical transmitters for converting electric signals output from said exchange to optical signals of unique wavelengths;
   a wavelength division multiplexer for wavelength division multiplexing the optical signals output from said optical transmitters, and for transmitting the wavelength division multiplexed optical signals to the optical fiber; and
   an optical amplifier for amplifying the wavelength division multiplexed optical signals to compensate for transmission loss for transmission to the subscriber through the optical fiber.

20. The optical fiber subscriber network of claim 19, further comprising a plurality of optical distributors placed on said optical fiber intervening between said central office and said optical subscriber devices for distributing the wavelength division multiplexed optical signals output from said central office according to construction of a service requesting network.

21. The optical fiber subscriber network of claim 20, further comprising an optical amplifier placed on said optical fiber intervening between said central office and said optical subscriber devices for compensating for distribution loss of the wavelength division multiplexed optical signals due to said optical distributors.

22. The optical fiber subscriber network of claim 18, wherein each said optical subscriber device comprises:
  an optical distributor for distributing the wavelength division multiplexed optical signals received through an incoming optical fiber to internal optical fibers;
  an optical receiver module connected to an output of said fixed optical filter for converting the corresponding optical signals output from said fixed optical filter to electric signals; and
  a fixed optical filter for filtering the wavelength division multiplexed optical signals to receive and select its respective allocated optical wavelength group and to output the corresponding optical signals.

23. The optical fiber subscriber network of claim 18, further comprising a plurality of optical distributors placed on said optical fiber intervening between said central office and said optical subscriber devices for distributing the wavelength division multiplexed optical signals output from said central office according to construction of a service requesting network.

24. The optical fiber subscriber network of claim 23, further comprising an optical amplifier placed on said optical fiber intervening between said central office and said optical subscriber devices for compensating for distribution loss of the wavelength division multiplexed optical signals due to said optical distributors.

25. The optical fiber subscriber network of claim 18, further comprising an optical amplifier placed on said optical fiber intervening between said central office and said optical subscriber devices for compensating for distribution loss of the wavelength division multiplexed optical signals due to said optical distributors.

26. The optical fiber subscriber network of claim 18, wherein each said optical subscriber device comprises a fixed optical filter for filtering the wavelength division multiplexed optical signals to receive and select its respective allocated optical wavelength group and to output the corresponding optical signals.

* * * * *